United States Patent
Voumard

[11] 3,919,810
[45] Nov. 18, 1975

[54] SLIDING UNIT FOR MACHINE TOOLS AND PARTICULARLY FOR GRINDING MACHINES

[75] Inventor: Bertrand Paul Voumard, La Chaux-de-Fonds, Switzerland

[73] Assignee: Voumard Machines Co. S.A., La Chaux-de-Fonds, Switzerland

[22] Filed: May 14, 1974

[21] Appl. No.: 469,793

[30] Foreign Application Priority Data
Sept. 17, 1973 Switzerland.................. 13293/73

[52] U.S. Cl............................ 51/165.87; 51/165.93
[51] Int. Cl.² ...................................... B24B 51/00
[58] Field of Search........ 51/165 R, 165.87, 165.93

[56] References Cited
UNITED STATES PATENTS

| | | | |
|---|---|---|---|
| 1,816,082 | 7/1931 | Heald | 51/165.93 X |
| 3,627,490 | 12/1971 | Asano | 51/165.87 |
| 3,640,024 | 2/1972 | Stahn | 51/165.87 |

*Primary Examiner*—Harold D. Whitehead
*Attorney, Agent, or Firm*—Stevens, Davis, Miller & Mosher

[57] ABSTRACT

A sliding unit for a grinding machine comprising a compact block table with parallel upper and lower faces and of a sufficiently small height to enable it to be placed on a base table of a grinding machine and carrying on its upper face an operating arrangement of the grinding machine and a slide drive mechanism positioned within said block table to cause said arrangement to carry out, under direct manual control or under indirect (manual or automatic) control, by means of an operator, all the functional movements of the grinding machine in the direction of slide of said slide mechanism. The drive mechanism includes a precision electric motor arrangement for controlling the coarse feed and plunge-cut transverse displacements of the grinding machine, a hydraulic arrangement for controlling the transverse displacements of engagement and disengagement of said grinding wheel, and a precision electric motor arrangement for controlling the transverse grinding wheel wear-take-up displacements.

9 Claims, 5 Drawing Figures

SLIDING UNIT FOR MACHINE TOOLS AND PARTICULARLY FOR GRINDING MACHINES

The present invention relates to a sliding unit for machine tools and particularly for grinding machines.

In machine tools, and particularly driving machines, a work headstock and a machining arrangement which in the case of a grinding machine comprises a wheel headstock must, in addition to rotary movements, carry out movements of longitudinal and transverse mutual translation. For the longitudinal mutual movements, various conventional devices are used to move a table which bears the work headstock or the machining arrangement. Certain problems arise on the other hand in controlling the transverse movements. The latter must, particularly in the case of a grinding machine, be carried out with very high precision, and it is known either to arrange the machining arrangement or the stock which is to carry out these transverse movements on a table supported by the frame of the machine and carrying out the desired transverse movements with respect to it, or else to provide on a table which carries out only longitudinal movements with respect to the frame an arrangement (wheel headstock) which itself comprises members which cause the transverse translations desired for the operation of the machine in accordance with the cycle selected.

These devices are relatively complicated, bulky and costly. Furthermore, they lack flexibility in adaptation, since they are connected either to the frame of the machine or to the machining arrangement of the machine and must therefore be constructed with due consideration of contingencies imposed by other operational elements. For instance, in a grinding machine in which the transverse feed mechanism is included in the wheel headstock constituting a unit as such, a change in wheel headstock results in a change in the transverse feed mechanism with all the connections, adjustments, regulations, etc., which this entails. Moreover, if the feed mechanism is included in the arrangement of the frame and of a table borne by it, the removal or change in the transverse displacement mechanism proves difficult, if not impossible.

The object of the present invention is to provide a sliding unit which can be used in particular on a grinding machine and which makes it possible to overcome the latter of the aforementioned drawbacks by imparting to the transverse translation mechanism a convenient, manageable form which assures great flexibility in the equipping of the machine, its mounting and use.

The sliding unit for machine tools and in particular for grinding machines in accordance with the present invention is characterized by the fact that it has the shape of an interposed table forming a compact block with parallel upper and lower faces, and of sufficiently small height that it can be placed on a base table of the machine and itself provide on its upper face a table adapted to bear an operating arrangement of the machine, a sliding drive mechanism being included in said block in order to cause the upper part thereof forming the table to carry out, under direct manual control or under indirect manual or automatic control, by means of an annexed operator, all the functional movements of the machine which must be effected by said arrangement in the direction of the said sliding.

This sliding unit advantageously has an arrangement adapted to enable it to bear a motor and a wheel-holder or workpiece-holder spindle device of the grinding machine, so as to form with said members a wheel-headstock or work-headstock assembly, the transverse movements of which are effected by means of said slide drive mechanism. The height of the block which constitutes the sliding unit forming an intermediate table preferably does not exceed about 20 cm, or even 15 cm.

In one embodiment which is particularly suitable for a grinding machine, and in particular an internal grinding machine, the sliding unit is further characterized by the fact that the said mechanism comprises a precision electric motor arrangement for controlling the coarse-feed and plunge-cut transverse displacements of the grinding machine, a hydraulic arrangement for controlling the transverse displacements of engagement and disengagement of the wheel, and a precision electric motor arrangement for controlling the transverse displacements for compensation for the wear of the grinding wheel.

In order to facilitate the mounting of the sliding unit and make it less expensive, as well as to be able to make it more compact, this latter embodiment is advantageously furthermore characterized by the fact that the said coarse-feed and plunge-cut displacement arrangement, the said wear take-up displacement arrangement, and the said hydraulic engagement/disengagement arrangement each constitutes a sub-unit which can be removed and replaced individually.

The accompanying drawing shows one embodiment of the present invention by way of example in which.

Figure 1:
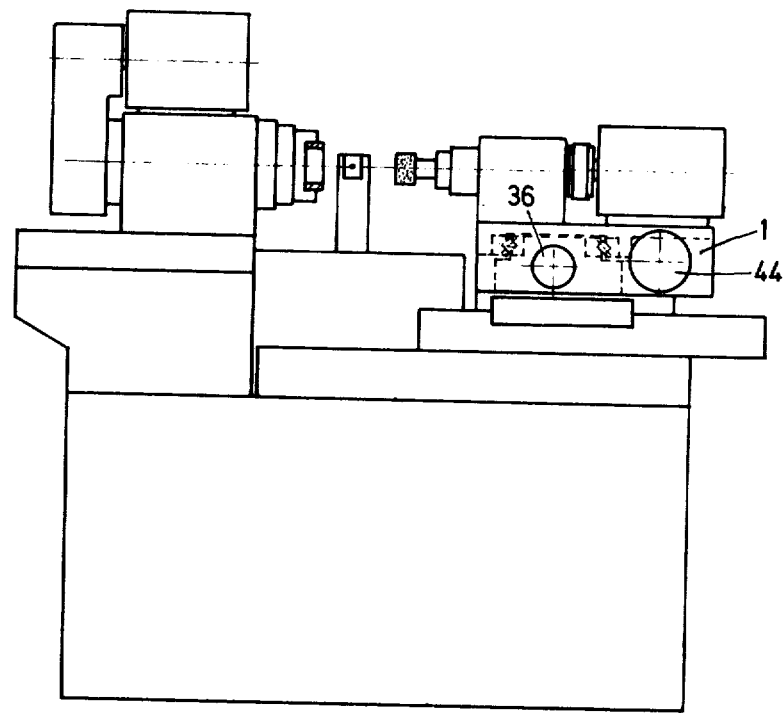
FIG. 1 is an elevation view of an internal grinding machine on which a sliding unit of the type in question is mounted as an intermediate table serving to effect the transverse movements.
Figure 2:
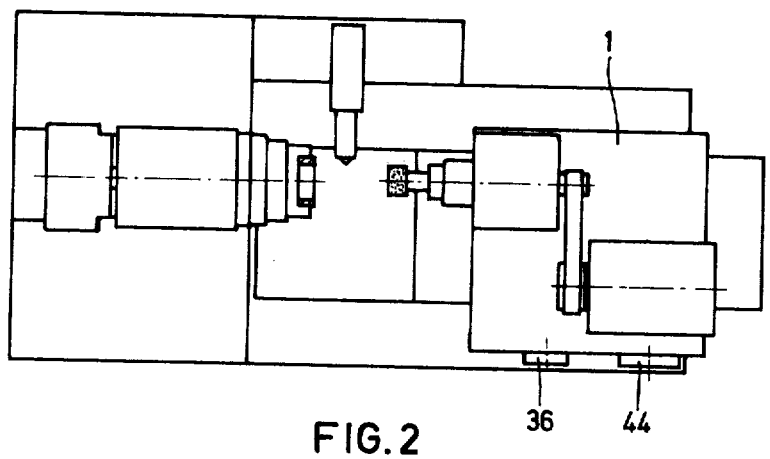
FIG. 2 is a plan view of the machine of FIG. 1.

FIGS. 1 and 2 show an internal grinding machine which, with the exception of an intermediate sliding unit 1 is of a known type. There can be noted therein, mounted on a frame, a work headstock bearing a workpiece the inside of which is to be ground, a truing diamond which, not visible in the drawing, is of the retractable type, and an operating arrangement comprising a wheelholding spindle which bears a grinding wheel, and a motor for the driving of said wheel, this arrangement being mounted not directly on a table of the frame, but rather on an intermediate table 1 which includes all the mechanical parts necessary to produce the transverse relative movements between the grinding wheel and the workpiece (or the diamond).

FIGS. 1 and 2 clearly show how the sliding unit forming the intermediate table 1 is located within the entire grinding machine.

Figure 3:
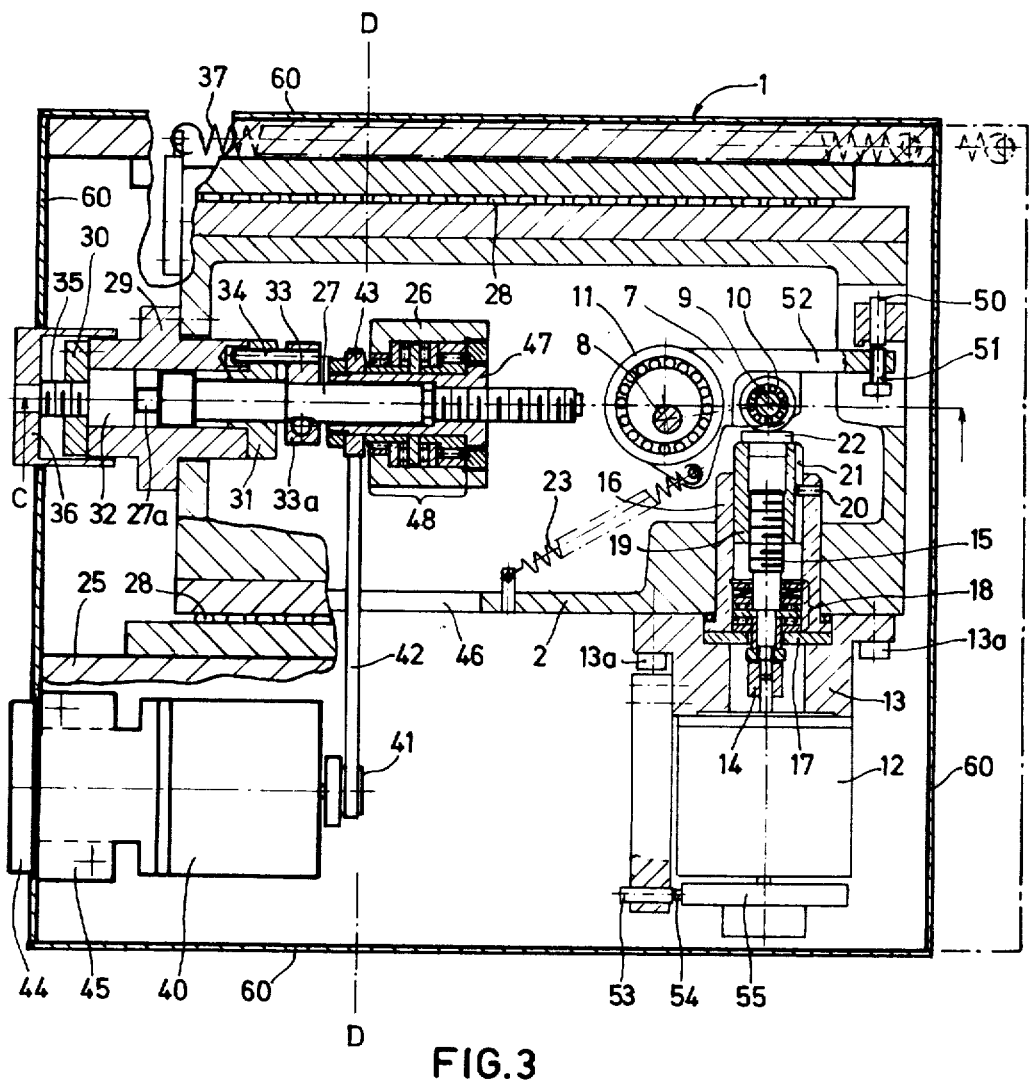
FIG. 3 is a top sectional view of the sliding unit, seen along the line A—A of FIG. 5 with a portion in section along the line B—B of FIG. 5, and a portion or upper part being assumed cut away in order to show the arrangement which it covers.
Figure 4:
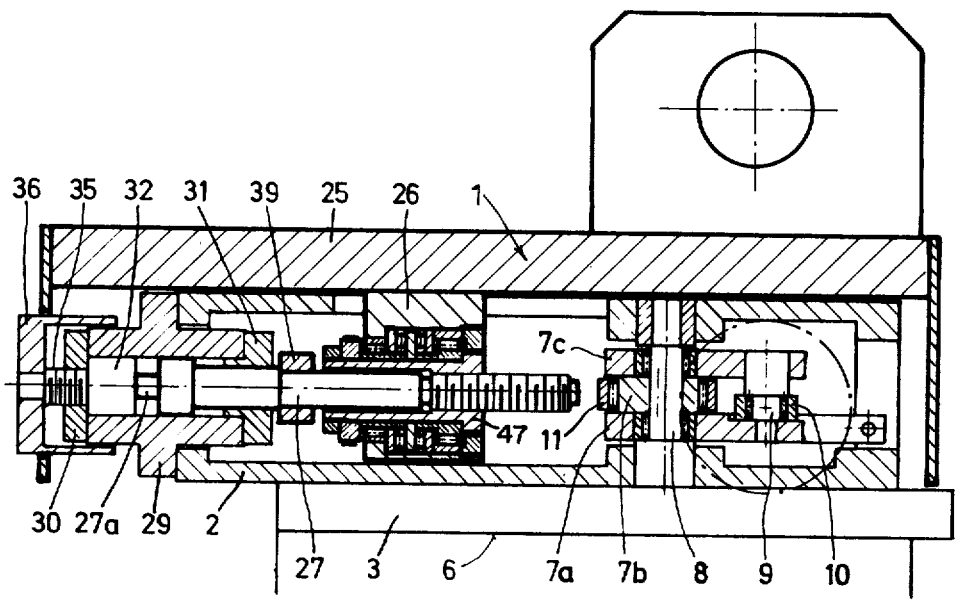
FIG. 4 is a vertical section along the line C—C of FIG. 3.
Figure 5:
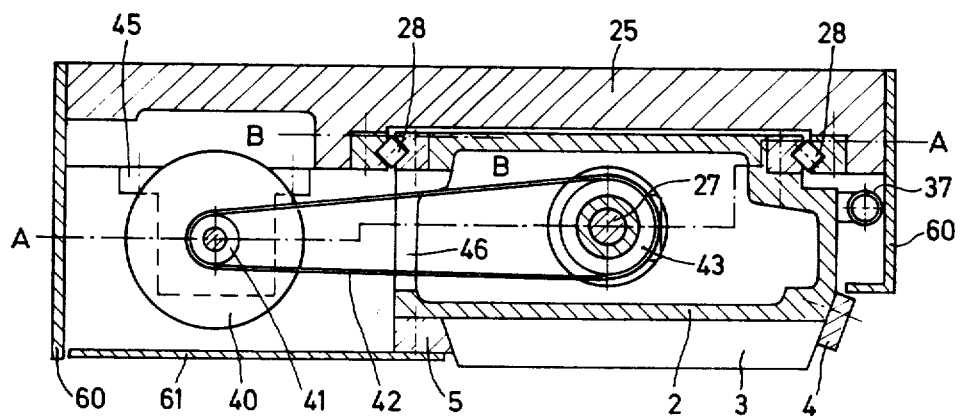
FIG. 5 is a sectional view along the line D—D of FIG. 3.

The sliding unit which forms the intermediate table which is shown in FIGS. 3 to 5 is adapted to meet the requirements which present themselves in the case of a grinding machine, and more particularly an internal grinding machine. It is known that in such a machine, the transverse displacements which the wheel must carry out with respect to the workpiece to be ground are primarily of three different types, namely the plunge-cut displacements, to which there may also be assimilated the coarse-feed displacements, the engagement/disengagement displacements, intended to permit the entrance and departure of the grinding wheel, particularly in order to effect truing of the latter by means of a diamond, and the displacements for taking up the wear of the grinding wheel, that is to say, the slight advances which must precede the truing of the wheel and which correspond to the decrease in the radius of the grinding wheel which the diamond will cause in order to refresh said wheel. In a modern internal grinding machine in which the final ground dimension is established by a precise plunge-cut up to a point determined by the mechanism itself which causes the plunge-cut displacement, it is important that the relationship between the position of the members controlling the plunge-cut and the position of the cutting periphery of the wheel is identical at all times. It follows that the displacements for the taking-up of the wear of the grinding wheel must be controlled in a manner different from the plunge-cut by modifying the (relative) position of the wheel headstock without the position of the precision members controlling the plunge-cut experiencing any change.

Furthermore, the engagement/disengagement displacements which must be carried out rapidly are controlled hydraulically and serve solely to place the wheel headstock either in a withdrawn (disengaged) position, which is preferably always identical and independent of the position of the means controlling the plunge-cut, or in an engaged position which must depend, in accordance with a strict law, on the position of the members controlling the plunge-cut.

It is therefore clear that a device for the control of the transverse movements of a grinding machine must include three different arrangements, a first arrangement for the plunge-cut (and coarse feed), the second for the taking up of the wear of the grinding wheel, and the third for the engagement/disengagement. It is precisely special members for the carrying out of these three functions which are present in the sliding unit forming a table which is shown in FIGS. 3, 4 and 5. The position of these three arrangements in the unit has been determined in order to obtain a complete mechanism which is as compact as possible while also assuring ease of mounting and dismounting by sub-units.

The unit 1 comprises first of all a single-piece base 2 which is a cast part intended to receive the different arrangements for the control of lateral movements. This base part 2 is intended to be fastened on a grinding-machine table (which itself carries out the necessary longitudinal movements). In FIG. 4 the base table 6 of the grinding machine on which the sliding unit 1 is fastened has been shown schematically. For reasons of convenience in attachment, the base part 2 does not rest directly on the lower table 6 of the grinding machine, but is provided below its lower face with a base plate 3 held by two oblique flanges 4 and 5 (FIG. 5). The base part 2 could, however, just as well constitute the bottom of the sliding unit to be fastened on the lower table 6.

FIGS. 3 to 5 show that the base part 2 has the shape of a box provided with numerous openings and also having numerous bosses. It is seen that a lever 7 is supported in the base part 2 around a pivot 8 which is force-fitted in bosses present on the lower portion and upper portion respectively of the base part 2. For reasons of convenience in manufacture, this lever 7 is composed in fact of three portions 7a, 7b and 7c, as shown in FIG. 4, it being understood that these three portions are firmly held together by means which have not been shown. The lever 7 pivots without play around the pivot 8 via roller bearings housed in the portions 7a and 7c. This lever bears a pivot 9 around which there is supported again without play, via a roller bearing, a roller 10 the function of which will be explained further below. Moreover, around its portion 7b, which is circular but eccentric with respect to the pivot 8, the lever 7 bears a roller 11 of larger dimension which is also supported without play via a roller bearing. It will be noted that, as can be seen from FIG. 3, the distance between the axis of the pivot 8 of the lever and the axis of the pivot 9 of the roller 10 is precisely five times greater than the distance between the axis of the pivot 8 and the axis around which the roller 11 turns (eccentricity of the portion 7b). Furthermore, the straight lines joining the center of the pivot 8 with respective centers of rotation of the rollers intersect at a right angle. The lever 7 therefore constitutes a stepped-down lever with an exact ratio of 1:5, this accuracy being established in the event that the actions on the respective rollers take place perpendicularly to each other.

It will be noted that the sectional view of FIG. 4 has been slightly distorted, for convenience in illustration, since both the pivot 8 and the roller 11 are assumed traversed diametrically by the sectional plane of FIG. 4. FIG. 3, however, makes it possible to re-establish precisely the arrangement of the different elements.

The sliding unit comprises an arrangement for controlling the transverse plunge-cut and coarse-feed movements, which arrangement employs a kinematic transmission via the lever 7. This arrangement comprises a step-by-step motor 12 mounted on the side of the base part 2 via a fastening part 13 fastened laterally by screws 13a against the outer wall of the base part 2. The shaft of this motor, via a sleeve 14, drive a rod 15 which passes through the center of a tubular part 16 traversing the wall of the base part 2. The tubular part 16 is held towards the rear (that is to say, in the direction of the motor 12) by a circular plate 17, and a play-eliminating arrangement 18, comprising two roller thrust bearings, two washers rigidly connected with the tubular part 16, one washer rigidly connected with the rod 15, and elastic axial-pressure means, assures an axial positioning without play of the rod 15 in the tubular part 16, that is to say, with respect to the base part 2. The front end (that is to say, the end furthest away from the motor 12) of the rod 15 bears a micrometric thread which cooperates with the inner micrometer thread of a sleeve 19 engaged in the tubular part 16 and prevented from turning in the latter by a "securing" bolt 20 which passes through the tubular part 16 and engages in a longitudinal groove 21 of the sleeve 19. A flat head 22 fastened to the front end of the sleeve 19 receives, resting against it, the roller 10 which is pressed in the direction of the head 22 by the action of a spring 23 which urges the lever 7 to turn in clockwise direction.

It will be understood readily that when the motor 12 turns, the sleeve 19 is screwed to a greater or lesser extent on the rod 15, which permits the lever 7 to turn to a greater or lesser extent, while maintaining the roller 10 applied against the head 22 of the sleeve 19. The stepped-down ratio between the step-by-step motor and the lever 7 will be referred to further below.

The upper portion of the sliding unit forming a table for a grinding-wheel support which has been shown schematically in FIG. 4 comprises an upper plate 25 adapted to slide in the transverse direction of the grinding machine, that is to say, in a direction parallel to the line C—C of FIG. 3, via roller bearings 28 of the "crossed-roller" type, which can best be noted in FIG. 5. A sleeve 26 is fastened below the plate 25 and, by means which will be discussed in detail further below, it is axially connected to a piston rod 27 so that the upper plate 25 slides rigidly together with longitudinal movements of the piston rod 27. This piston rod is part of another transverse movement arrangement intended to cause the grinding wheel, that is to say, the plate 25, to carry out the transverse movements of engagement and disengagement. This arrangement comprises a cylinder 29, closed by covers 30 and 31, which is engaged on the front from the outside in the wall of the base part 2. The piston rod 27 penetrates into this cylinder which, by means not shown, receives a hydraulic pressure in one direction or the other, corresponding with disengagement or engagement orders. In accordance with the hydraulic control, the piston rod 27 and with it the sleeve 26 and the upper plate 25 move in the transverse direction of the grinding machine, that is to say, in the direction of the line C—C of FIG. 3. When the piston rod 27 is brought hydraulically into disengagement position, its end 27a within the piston comes to rest against a stop 32 which can be positioned nearer or farther in the cylinder 29 by means of a threaded rod 35 which said stop has and which passes through a narrow tapping of the cover 30 of the cylinder. A drum 36 rigidly connected on this rod 35 makes it possible, by rotation of the latter, to displace the stop 32 within the cylinder 29. In this way therefore the position to which the upper plate 25 moves back when a disengagement order is given hydraulically can be adjusted by means of the drum 36 which controls the stop 32. FIGS. 3 and 4 show this stop 32 in its most retracted position, that is to say, the position thereof which causes maximum disengagement. When a hydraulic engagement order is given, the piston rod 27, driving the sleeve 26 and the upper plate 25 with it, rests via its flat front face against the roller 11. Depending on the position of this roller 11, the upper plate 25 will therefore assume a position which is advanced to a greater or lesser extent in the transverse direction. The hydraulic pressure assures the tight application of the head of the piston rod 27 against the roller 11. Furthermore, two springs located below the slide bearings 28, but only one of which, 37, is shown in the drawing for reasons of convenience, assure a permanent pulling of the upper plate 25 towards the front face of the sliding unit, that is to say, in the direction of the face where the drum 36 is located. Any axial play between the piston rod 27 and the sleeve 26 is therefore constantly taken up. On the other hand, these springs 37 have a safety function, since they automatically cause disengagement in the event that the hydraulic control pressure is interrupted.

It is of interest to indicate the ratios of the control of the plunge-cut displacement. The step-by-step motor carries out steps 1/400 of a revolution, and the micrometer screw of the rod 15 and of the jacket 19 has a pitch of 1 mm. One step of the motor 12 therefore advances the sleeve 19 and the roller 10 by 2.5 microns, with the result that the roller 11 carries out a displacement of half a micron which is transmitted to the piston rod 27, the sleeve 26 and the upper plate 25, and finally arrives at the grinding wheel. One step of the step-by-step motor 12 therefore causes a plunge-cut of ½ micron on the ground radius, that is to say, of 1 micron on the ground diameter.

It is clear that this great a precision can be obtained only by a kinematic transmission which is free of play, and it has been found that the kinematic chain employing the lever 7 and the rollers 10 and 11 was extremely rigid, the compactness of the system described here making it possible to obtain grinding precision of the order of one or two microns for large-series work, which is entirely remarkable.

Note should furthermore be taken of the arrangement which controls the transverse displacements for the taking-up of the wear of the grinding wheel. This arrangement comprises a step-by-step electric motor 40 which may be driven, in order to carry out a certain number of steps, either by an automatic electronic control or by an electric control which is actuated manually for instance by a pushbutton. The shaft of the motor 40 may also be moved directly by hand by means of a drum 44 fastened to the other end of the shaft of the motor which projects in the front face, said drum 44 being thus located along side the drum 36. The motor 40 is fastened below the upper plate 25 along side of the base part 2 via a fastening part 45. The portion of the shaft of the motor 40 on which the drum 44 is fastened passes through this fastening part 45. At its other end, the shaft of the motor 45 gears a grooved pulley 41 on which there is engaged a grooved endless belt 42. This belt passes through an opening 46 provided in the side wall of the base part 2 and engages aroung a grooved pulley 43 which is borne in a special manner by the sleeve 26. The grooves of the belt 42 which cooperate with the grooves of the pulleys 41 and 43 assure a slip-free transmission from the step-by-step motor 40 up to the pulley 43. The latter is firmly connected on a sleeve 47 borne within the sleeve 26. By an assembly 48 of radial and axial roller bearings 48, the sleeve 47 and the sleeve 26 are held fast axially without play, despite the possibility of mutural rotation between these parts. It is seen furthermore that the piston rod 27 bears, between the cylinder 29 and the place where it penetrates into the sleeve 47, a flange 33 which is fastened by a pin 33a to the piston rod 27 and itself bears an eccentric pin 34 parallel to the piston rod 27, and penetrating into a marginal bore hole in the piston cover 31. This arrangement absolutely prevents the piston rod 27 from turning on its axis, and the rotation of the sleeve 47 through which said piston rod passes can in no case be transmitted to it. Now, it is precisely via the sleeve 47 that the connection between the piston rod 27 and the sleeve 26 is established, a micrometer screw being threaded on the end of the piston rod 27 which is furthest away from the cylinder 29, and a corresponding thread being provided on the inside of the sleeve 47. A rotation of the motor for the transverse take-up displacement 40 will therefore, as a result of a rotation of the sleeve 47, cause an axial shift between the piston rod 27 and the sleeve 26. For a given plunge-cut position corresponding to a specific position of the resting of the piston rod 27 against the roller 11, an angular displacement of the shaft of the motor 40, driven either electrically or manually by the drum 44, will establish different positions for the axis of the grinding wheel, it being understood that these positions correspond to different grinding-wheel diameters and that the dressing (or diamond-truing) of the wheel will assure one and the same position of the place of abrasion for these different positions of the axis of the grinding wheel. With the sliding unit described above, the diamond-truing will be in a position disengaged from the grinding wheel, the position of the stop 32, which is adjustable by the drum 36, determining the position of the table 25 at the zero point, that is to say, at the point where the periphery of the grinding wheel is located transversely above the point of the diamond.

In general, the grinding machine equipped with the sliding unit described above will be controlled by an automatic electronic device (operator). Such an electronic control of a grinding machine effecting the three functions of transverse plunge-cut and coarse feed movement, engagement/disengagement movement, and movement for the taking up of the war of the grinding wheel is known. However, it is possible and advantageous, taking into account the favorable arrangement of the drum 44, to use the sliding unit 1 entirely in manual control, for instance, for the grinding of single prototype parts. Under these conditions, the coarse feed and plunge-cut motor 12 will be left stationary, and the entire transverse stroke of the grinding wheel will be controlled manually by means of the drum 44 acting on the sleeve 47 via the belt 42 and the pulley 43. The motor 40, similar to the motor 12, has steps 1/400 of a revolution. Furthermore, the micrometer screw pitch of the sleeve 47 and of the threaded end of the piston rod 27 is also 1 mm. On the other hand, the transmission ratio by the grooved belt between the pulley 41 and the pulley 43 is 1:2.5, while it was 1:5 in the case of the lever 7. Under these circumstances, one step of the motor 40, or an advance by one division on the drum 44, will bring about a displacement of the grinding wheel by 1 micron, that is to say, a plunge-cut of 2 microns measured on the ground diameter.

When the plunge-cut position is to be returned to its starting point, for instance after change of the workpiece during the course of the grinding, the electronic control proceeds preferably not by the counting of the rearward steps, but by sending a rapid rearward rotation frequency. It is then necessary to indicate the arrival of the plunge-cut control arrangement in the initial position where it is to stop. For this, an extension 52 of the lever 7 bears a screw 51 the entering of which into contact with a proximity detector 50 causes the giving off of a signal intended for the automatic electronic control operator. This signal indicates that the step-by-step motor 12 is in the process of carrying out its last turn before its arrival at the position where it is to stop. Thereupon another proximity contact 53, mounted on the rear of the motor 12, detects the passage of an index marker 54 located on the periphery of a flywheel 55 fastened on the shaft of the motor 12 at the rear of the latter. The precision of the detection of a position by the detector 53 which sends a signal to the electronic operator upon the passing of the index marker 54 makes it possible to stop the step-by-step motor 12 at the exact step desired. In order to obtain this result with greater reliability, the electronic control, however, reduces the frequency of the feed of the motor 12, and therefore the speed of the latter, when the detector 50 has reported that the motor is effecting its last turn before having to stop. At most, the motor 12 can effect 25 turns, which, from the starting position, causes the head 22 of the sleeve 19 and the roller 10 to move back by 25 mm. The sleeve 19 then occupies its most retracted position in the tubular part 16. For this 25-mm stroke of the sleeve 19, the roller 11 moves back 5 mm, and the maximum plunge-cut stroke which can be imparted to the rod 27 is therefore 5 mm. The screwing of the rod 27 in the sleeve 47 on the other hand permits a maximum take-up of 40 mm. The latitude of maneuvering by means of the flywheel 44 is therefore substantial. Finally the stop 32 can move 8 mm until it pushes the rod 27 almost (within a few microns) into contact with the roller 11 if the latter is in its starting position. The minimum disengagement which can be adjusted by means of the stop 32 is therefore practically zero, while the maximum disengagement is 8 mm. The maximum displacement of the slide, taking into account the three possibilities of displacement control, is therefore 5 mm + 40 mm + 8 mm = 53 mm. This is an important measurement for a grinding process. In addition to this, it is clear that one can also position the sliding unit on the table of the machine and the spindle support on the sliding unit if different manners so that the flexibility of use of the unit is very great. If this proves necessary, it is also possible to fasten the unit on the lower table of the machine not in the manner shown in FIG. 2, but rather obliquely, which would provide the possibility of causing the working arrangement borne by the unit to carry out an oblique displacement with respect to the axis of the machine.

With regard to the construction of the unit, it will furthermore be noted that protective plates 60, rigidly connected with the upper plate 25, and protective plates 61, rigidly connected with the base part, are mounted to impart the unit a well defined shape and protect its members from dust.

It is clear that numerous other embodiments of the intermediate unit in accordance with the present invention could be provided. It will be noted that the horizontal arrangement in two directions, with stepped-down lever and converter of the direction of movement, makes it possible to obtain a surprisingly compact unit and, despite the fact that it contains control elements whose volume remains the same, is substantially smaller than were the previously known transverse displacement mechanisms. It also will be noted that the mounting and dismounting of the three arrangements (plunge-cut, coarse feed, engagement-/disengagement, wear take-up of the grinding wheel) can be effected in an extremely simple manner, the base part remaining alone with the lever 7 provided with its rollers, and the putting in place of the two arrangements which cooperate with the rollers being capable of being effected in a very simple manner which assures a high precision operation without the necessity of excessively complicated and expensive mounting precautions. Once unscrewed, the screws 13a which hold the motor 12 and the arrangement relative thereto, the screws, not indicated, which similarly fasten the cylinder 29 and the arrangement relative to it, and the screws, also not indicated, which fasten the motor 40, the sliding unit is already practically dismounted, since there will now only be the upper table 25 with the sleeves 26 and 47 covering the base part which now contains only the lever 7 with its rollers.

What is claimed is:

1. A sliding unit for a grinding machine comprising a compact block table to be placed on a base table of a grinding machine for carrying on a portion thereof an operating arrangement of the grinding machine, and a slide drive mechanism positioned within said block table to cause said arrangement to carry out all the functional movements of the grinding machine in the direction of slide of said slide mechanism, said mechanism comprising a precision electric motor arrangement for controlling the coarse-feed and plunge-cut transverse displacements of the grinding machine, said coarse-feed and plunge-cut displacement arrangement comprising a step-by-step electric motor whose shaft is perpendicular to the direction of slide, a micrometric stepped-down device and a lever which steps down without play the movement of said micrometric device and modifies the direction of displacement by 90° and permits, in an engagement position, the defining of the plunge-cut with a precision on the order of a micron, said lever comprising two rollers on a raceway, whose axes are located, with respect to the pivot axis of said lever, 90° apart from each other and at distances apart corresponding to the stepped-down ratio of said lever, the roller located furthest from the pivot axis resting against the flat head of a sleeve comprised by said micrometric device, while the flat head of a piston rod which drives the portion rests, in position of engagement of said hydraulic arrangement, against the roller whose axis is closest to the axis of pivot of the lever, and said last-mentioned roller being supported in the manner of an eccentric on a raceway passing around the pivot axis of said lever.

2. The sliding unit according to claim 1, in which said arrangement includes a motor and a wheel-holding or workpiece-holding spindle drive of the grinding machine so as to form with said block table and said slide drive mechanism a wheel headstock or work headstock assembly, the transverse movements of which are carried out by means of said slide drive mechanism.

3. The sliding unit according to claim 2, further comprising a hydraulic arrangement for controlling the transverse displacements of engagement and disengagement of said grinding wheel, and a precision electric motor arrangement for controlling the transverse grinding wheel wear-take-up displacements.

4. The sliding unit according to claim 3, in which said arrangement for controlling said grinding-wheel wear-take-up movements comprises an electric motor whose shaft also may be placed in rotation manually by a drum fastened on an extension of the shaft of said motor, said drum being accessible from the front side of said unit perpendicular to the direction of said sliding.

5. The sliding unit according to claim 4, in which said hydraulic arrangement comprises a stop serving to define the position of engagement and truing of said grinding wheel, the position of said stop being adjustable manually by rotation of a drum accessible from the said front side of the unit.

6. The sliding unit according to claim 3, in which said coarse-feed and plunge-cut displacement arrangement, said take-up displacement arrangement, and said hydraulic engagement/disengagement arrangement each constitute a sub-unit which can be removed and replaced as a unit.

7. The sliding unit according to claim 6, comprising a single-block base part in which a transmission and stepped-down lever is mounted without play, said coarse-feed and plunge-cut displacement arrangement, put in place in a premounted block laterally in said base part so as to cooperate with an element borne by said lever, said hydraulic engagement and disengagement displacement arrangement put in place at the front of said unit as a premounted block in said base part so as to cooperate in engaged position with an element borne by said lever, a sliding upper plate forming a table and rigidly connected with a nut-sleeve mounted on said hydraulic arrangement, and said take-up displacement arrangement formed of a motor and a drum permitting manual movement of the shaft of said motor and mounted as a block under said upper plate along said base part.

8. The sliding unit according to claim 1, in which the height of said table is not greater than approximately 20 cm.

9. The sliding unit according to claim 1, in which said grinding-wheel wear-take-up arrangement comprises a step-by-step motor whose axis is arranged parallel to the direction of said slide and which, by means of a slip-free transmission, drives a nut-sleeve which is axially firmly connected to the portion, said nut-sleeve being engaged on a micrometer screw threaded on the end of the said piston rod, the play being eliminated by means of at least one spring which urges the table and the sleeve towards the position of disengagement.

* * * * *